(12) United States Patent
O'Brien et al.

(10) Patent No.: US 10,118,862 B2
(45) Date of Patent: Nov. 6, 2018

(54) MULTI-METAL OXIDE CERAMIC NANOMATERIAL

(71) Applicant: Research Foundation of the City University of New York, New York, NY (US)

(72) Inventors: Stephen O'Brien, New York, NY (US); Shuangyi Liu, New York, NY (US); Limin Huang, Newark, NJ (US)

(73) Assignee: Research Foundation of the City University of New York, New York, NY (US)

( * ) Notice: Subject to any disclaimer, the term of this patent is extended or adjusted under 35 U.S.C. 154(b) by 94 days.

(21) Appl. No.: 15/083,885

(22) Filed: Mar. 29, 2016

(65) Prior Publication Data

US 2016/0280606 A1    Sep. 29, 2016

Related U.S. Application Data

(62) Division of application No. 14/445,760, filed on Jul. 29, 2014, now Pat. No. 9,359,259.

(60) Provisional application No. 61/859,447, filed on Jul. 29, 2013.

(51) Int. Cl.
| | |
|---|---|
| *C04B 35/624* | (2006.01) |
| *C04B 35/462* | (2006.01) |
| *C04B 35/626* | (2006.01) |
| *C04B 35/632* | (2006.01) |
| *C01G 45/12* | (2006.01) |

(Continued)

(52) U.S. Cl.
CPC .............. *C04B 35/624* (2013.01); *C01G 1/02* (2013.01); *C01G 45/12* (2013.01); *C01G 45/1221* (2013.01); *C04B 35/462* (2013.01); *C04B 35/4686* (2013.01); *C04B 35/6264* (2013.01); *C04B 35/6325* (2013.01); *C01P 2002/72* (2013.01); *C01P 2002/85* (2013.01); *C01P 2006/40* (2013.01); *C04B 2235/3215* (2013.01); *C04B 2235/3267* (2013.01); *C04B 2235/441* (2013.01); *C04B 2235/765* (2013.01)

(58) Field of Classification Search
CPC . C04B 35/462; C04B 35/624; C04B 35/6325; C04B 35/6264; C04B 2235/3267; C04B 2235/765; C04B 2235/441; C04B 2235/3215
See application file for complete search history.

(56) References Cited

U.S. PATENT DOCUMENTS

2007/0031312 A1*  2/2007  Payne ................ C01G 45/1264
                                                                    423/263

OTHER PUBLICATIONS

Di Maggio, Rosa, Renzo Campostrini, and Graziano Guella. "Gels from modified zirconium n-butoxide: a pyrolysis study by coupled thermogravimetry, gas chromatographic, and mass spectrometric analyses." Chemistry of materials 10.12 (1998): 3839-3847.*

(Continued)

*Primary Examiner* — Richard M Rump
(74) *Attorney, Agent, or Firm* — Peter J. Mikesell; Schmeiser, Olsen & Watts, LLP

(57) ABSTRACT

A convenient and versatile method for preparing complex metal oxides is disclosed. The method uses a low temperature, environmentally friendly gel-collection method to form a single phase nanomaterial. In one embodiment, the nanomaterial consists of $Ba_A Mn_B Ti_C O_D$ in a controlled stoichiometry.

9 Claims, 14 Drawing Sheets

(51) Int. Cl.
    *C01G 1/02*     (2006.01)
    *C04B 35/468*     (2006.01)

(56) References Cited

OTHER PUBLICATIONS

Niederberger, M. et al., "Nonaqueous and halide-free route to crystalline BaTiO3 and (Ba, Sr) TiO3 nanoparticles via a mechanism involving c-c bond formation", JACS 126, 9120(2004).

Huang, L. M. et al., "High K capacitors and OFET gate dielectrics from self-assembled BaTiO3 and (BA,Sr)TiO3 nanocrystals in the superparaelectric limit", Adv. Funct. Mater. 20, 554(2010).

Liu, S. Y. et al., "Comprehensive dielectric performance of bismuth acceptor doped BaTiO3 based nanocrystal thin film capacitors.", J. Mater. Chem, 22, 21862(2012).

Ould-Ely, T. et al., "Large-scale engineered synthesis of BaTiO3 nanoparticles using low-temperature bioinspired principles", Nature Protocols, vol. 6, pp. 97-104, 2011.

Brutchey, R. et al., "Template-free, low-temperature synthesis of crystalline barium titanate nanoparticles under bio-inspired conditions", Angewandte Chemie-International Edition, vol. 45, p. 6564-6566, 2006.

Cui, Bin et al., "Preparation and characterization of CO-doped BaTiO3 nanosized powders and ceramics." Materials Science and Engineering: B133.1 (2006): 205-208.

Misra, Sudhindra N., Ram S. Shukla, and Minaz A. Gagnani. "Praseodymium (III)-substituted bismuth titanate thin-film generation using metallo-organic precursors with an M-O-C skeleton and sol-gel technique and employing 4f-4f transition spectra as a probe to explore kinetic performance." Journal of colloid and interface science 261.1 (2003): 107-11.

\* cited by examiner

MULTI-METAL OXIDE CERAMIC NANOMATERIAL

CROSS-REFERENCE TO RELATED APPLICATIONS

This application claims priority to and is a divisional of U.S. patent application Ser. No. 14/445,760 (filed Jul. 29, 2014) which is a non-provisional patent application of U.S. Patent Application 61/859,447 (filed Jul. 29, 2013). The entirety of these applications is hereby incorporated by reference.

STATEMENT OF FEDERALLY SPONSORED RESEARCH OR DEVELOPMENT

This invention was made with Government support under Contract No. DE-AR0000114 awarded by the Department of Energy Advanced Research Projects Agency-Energy (DOE, ARPA-E). The government has certain rights in the invention.

BACKGROUND OF THE INVENTION

The subject matter disclosed herein relates to bi-metal and multi-metal oxide ceramics.

Functional ceramics have been a research focus due to their wide applications in the electronic industry. With the requirements of miniaturization, integration and sustainable development, green technologies of low energy consumption, environmentally friendly synthesis and new materials with distinguished properties and being printable are drawing more and more attentions. Ferroic inorganic solids find utility across a broad range of applications in the electronics industry because of magnetic and electrical properties. Multiferroics represent an outstanding twenty-first century challenge toward next generation electronics but progress is limited by physical restrictions on the co-existence of substantive magnetic or electrical performance in known compounds. Single phase oxides that contain three or more metals provoke excitement in structure and property discovery, especially where the properties are remarkable. Additional functional ceramics are therefore desirable.

The discussion above is merely provided for general background information and is not intended to be used as an aid in determining the scope of the claimed subject matter.

BRIEF DESCRIPTION OF THE INVENTION

A convenient and versatile method for preparing complex metal oxides is disclosed. The method uses a low temperature, environmentally friendly gel-collection method to form a single phase nanomaterial. In one embodiment, the nanomaterial consists of $Ba_AMn_BTi_CO_D$ in a controlled stoichiometry.

In a first embodiment, a method for producing a metal oxide ceramic nanomaterial is disclosed. The method comprising steps of mixing a first metal-organic salt comprising a first metal ($M^1$) and a second metal-organic salt comprising a second metal ($M^2$) in an anhydrous solvent to form a first intermediate, wherein $M^1$ and $M^2$ are independently selected from the group consisting of barium, manganese, titanium, iron, nickel, copper, bismuth, cobalt, samarium, and praseodymium, wherein $M^1$ and $M^2$ are different. Water is added to the anhydrous solvent to hydrolyze the first intermediate to produce a precursor solution. The precursor solution is permitted to form a gel wherein, after gel formation, at least 90% of $M^1$ and $M^2$ is integrated into the gel. The gel is formed into a nanomaterial.

In a second embodiment, a method for producing a multi-metal oxide ceramic nanomaterial is disclosed. The method comprising steps of mixing a first metal-organic salt comprising a first metal ($M^1$), a second metal-organic salt comprising a second metal ($M^2$) and a third metal-organic salt comprising a third metal ($M^3$) in an anhydrous solvent to form a first intermediate, wherein $M^1$, $M^2$ and $M^3$ are independently selected from the group consisting of barium, manganese, titanium, iron, nickel, copper, bismuth, cobalt, samarium, and praseodymium, wherein $M^1$, $M^2$ and $M^3$ are different. Water is added to the anhydrous solvent to hydrolyze the first intermediate to produce a precursor solution. The precursor solution is permitted to form a gel wherein, after gel formation, at least 90% of $M^1$, $M^2$ and $M^3$ is integrated into the gel. The gel is sintered for a predetermined time at a predetermined temperature to form a nanomaterial, wherein the predetermined temperature is less than 180° C.

In a third embodiment, a nanomaterial with a formula $Ba_AMn_BTi_CO_D$ is disclosed, where A is 1 to 2, B is 2 to 4, C is 3 to 5 and D is 12 to 18.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

This disclosure provides an environmentally friendly synthesis method for forming multi-metal oxide ceramic nanomaterial, such as a nanocrystal, and the multi-metal oxide ceramic nanomaterial resulting therefrom. The method permits the synthesis of multi-metal oxide ceramic nanomaterial with tunable sizes, tunable properties, provides low energy consumption, minimal waste, is environmentally friendly, has high yield and the multi-metal oxide ceramic nanomaterial are easy to collect. As used in this specification, the phrase "multi-metal" refers to three or more different metals. The phrase "bi-metal" refers to two different metals.

Low temperature chemical deposition methods for preparing high quality crystalline oxide films are interesting for purposes of miniaturization and integration, to serve the needs of the electronics industry. An example is high dielectric constant oxides, of interest for gate dielectrics, capacitor integration and on chip power design. This disclosure provides a convenient and versatile method for preparing complex oxides using a low temperature technique referred to as "gel-collection" method, or "gel-rod" method. The gel-collection method was applied to the synthesis of barium, manganese, and titanium compositions, with the goal of introducing multifunctionality into a lattice framework using Mn and Ti ions to obtain complimentary magnetic and dielectric/ferroelectric properties, and potentially generating coupling between them. The scope is naturally not restricted to these elements, since the possibility for intersubstitution with a variety of main group or transition metals, rare earths and actinides opens the floor to a wide range of compositions, such as Fe, Ni, Cu, Bi, Sm, Pr, to name a few.

Figure 1A:
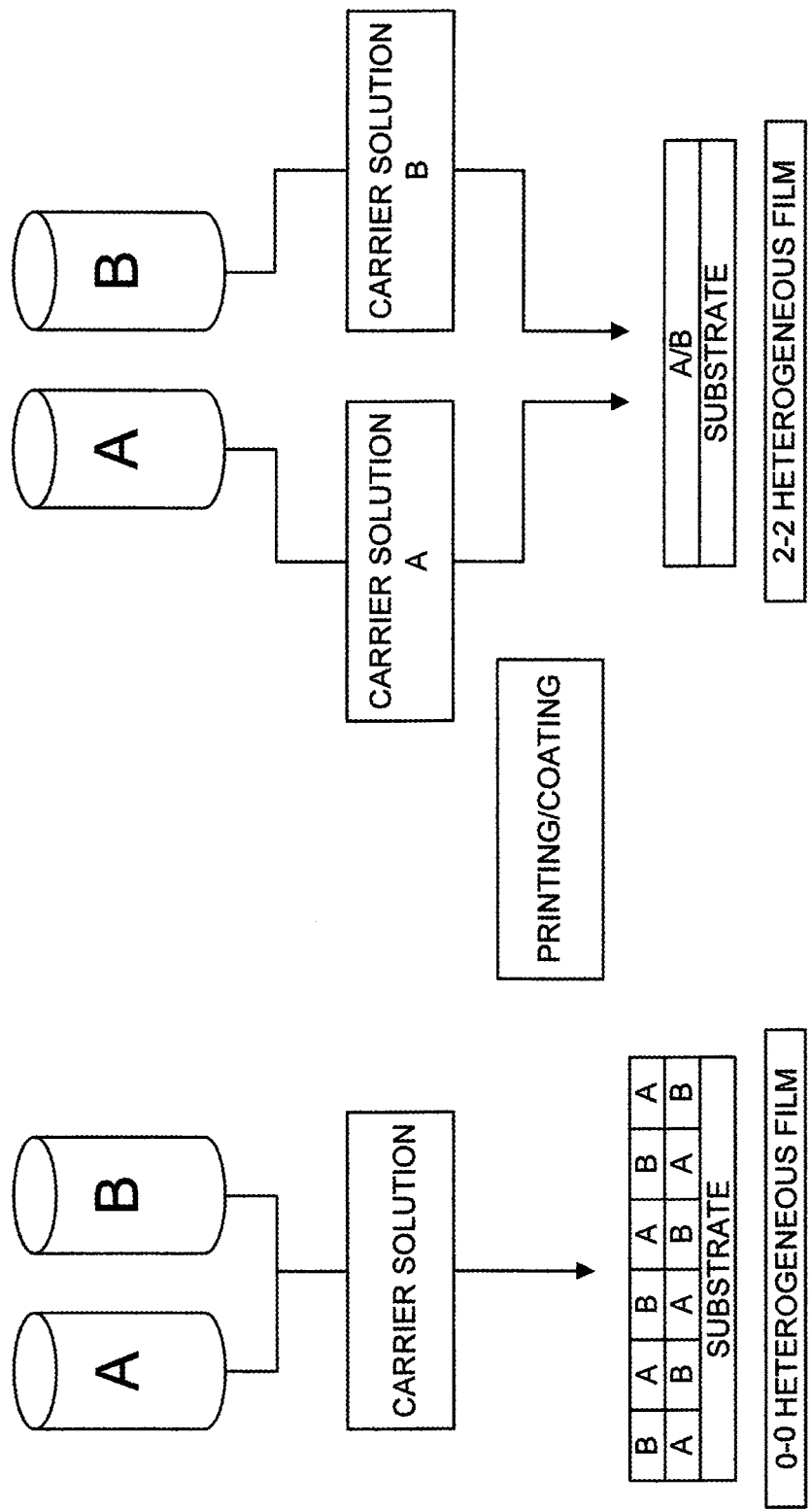
FIG. 1A is a schematic illustration of two methods of producing a heterogeneous film comprising a nanomaterial.

Compared to traditional sol-gel or hydrothermal methods, the unique features of the gel-collection pathway are that (i) the final product can be controlled through selection of the type of precursor metal-organic salt and, (ii) the products after solvothermal reaction phase separate from the reagent with assembling into a oxide framework with no source materials in residue (producing >99% yields. The product framework is a short-range order nanoscale metal oxide—fully crystallized at the nanoscale, without long range densification. The stoichiometric ratio of the final product is controllable through appropriate molar mixing of the reactants, and the substitution and doping concentration can be controlled precisely from the onset. Therefore, the design of new complex oxides with target crystal structures and properties, and optimization of the properties through substitution, doping and changing stoichiometric ratio is possible through a very efficient pathway. Moreover, because the as-synthesized oxide framework is a nanomaterial with short-range order and essentially a gel/putty consistency, it allows for different potential morphologies to be created, such as films, monoliths or rods, and composites (heterogeneous nanocomposite films 2-2, 0-0 or 3-0). See FIG. 1A. The nanomaterial may also be subjected to hydraulic pressing and annealing to form a bulk with nanoscale grains. In another embodiment, the nanomaterial is dissolved or suspended in a carrier solution and deposited on a substrate as a nanofilm.

In addition to the disclosed methodology, this disclosure also presents a new class of ferroics and multiferroics based on the Hollandite structure. Oxides of Ba, Mn, Ti are almost non-existent in nature and synthetic processing is required. Advancing inorganic chemical synthesis techniques through the disclosed gel-rod method has provided a new region of phase space. For example, $BaMn_3Ti_4O_{14.25}$, prepared by this method is a ferroelectric, with strong experimental evidence to support the origin of the ferroelectricity to be an electron correlation effect between $Mn^{3+}$—$Mn^{4+}$. $BaMn_3Ti_4O_{14.25}$ is a giant dielectric constant material ($\varepsilon_r \sim 10^4$, 1 kHz), with an unusually high dielectric constant ($\varepsilon_r \sim 200$) up to 100 MHz. $BaMn_3Ti_4O_{14.25}$ is also a ferromagnet below 42K, showing antiferromagnetic ordering of the $Mn^{3+}$—$Mn^{4+}$.

Complex manganese and titanium oxide frameworks present possibilities for achieving direct spin-polarization coupling due to the diversity in magnetism of the manganeses cations (S=5/2, 2 and 3/2 for $Mn^{2+}$, $Mn^{3+}$ and $M^{4+}$ respectively), combined with the "$d^0$-ness" of $Ti^{4+}$ cations, which can facilitate long range ordering through LUMO hybridization with O 2p orbitals. In nature, and excluding silicates, there are fourteen oxides that contain Ba, Ti, and O ions, and fifteen oxides that contain Ba, Mn and O ions (co-residing with a number of other metal cations such as Fe, Cr, V etc.). Surprisingly, there are no minerals classified as being composed of exclusively Ba, Ti, Mn and O ions, despite the fact that these are, respectively, the fourteenth, twelfth and ninth most abundant metals in the Earth's crust.

A series of multi-metal oxide ceramic nanomaterials are provided (see, for example, Table 1) using a gel-rod method followed by a low temperature sintering process. Some of the multi-metal oxide ceramic nanomaterials have shown exceptional properties such as giant dielectric constant, ferroelectric, ferromagnetic, multiferroic, magnetocaloric and electrocaloric effects. Because the multi-metal oxide ceramic nanomaterials are aggregate-free and uniform in size they can be dissolved into a variety of carrier solutions for making related embedded devices such as capacitors, gate dielectrics for field effect transistors, memory and power storage cells, magnetocaloric and electrocaloric refrigeration components.

TABLE 1

Exemplary complexes

| Ba/Ti multi-metal complexes | Fe/Ti multi-metal complexes | Co/Fe multi-metal complexes | Ni/Co multi-metal complexes |
|---|---|---|---|
| $Ba_{1-1.12}Mn_xTi_{8-x}O_{16}$ | Fe—Mn—Ti—O | Co—Fe—Ti—O | Ni—Co—Fe—Mn—O |
| $Ba_ySr_{1-y}Mn_xTi_{8-x}O_{16}$ | Ni—Fe—Ti—O | Co—Fe—Mn—O | Ni—Co—Ti—O |
| $BaMn_3Ti_4O_x$ | | | Ni—Co—Fe—O |
| $Ba_{1-1.12}Fe_xTi_{8-x}O_{16}$ | | | |
| $BaMn_3Ti_4O_{14.25}$ | | | |
| $BaMn_3Ti_4O_{16}$ | | | |
| Ba—Co—Ti—O | | | |
| Ba—Ni—Ti—O | | | |
| Ba—Gd—Ti—O | | | |

After the gel-rod method has been performed, multi-metal oxide ceramic complexes are subjected to sintering to produce the multi-metal oxide ceramic nanomaterials. Certain binary metal oxides (such as $BaTiO_3$) and substitutions of the pure binary metal oxides by other cations at different ratios may be completely crystallized without a sintering process (such as $(Ba, Sr)TiO_3$ and $(Ba, Gd)(Ti, Zr, Hf)O_3$). Many nanoscale counterparts of the widely reported binary oxide ceramics with attractive applications can be synthesized (such as, $ABO_3$ type —$CaTiO_3$, $BaTiO_3$, $Ba_xSr_{1-x}TiO_3$, $SrTiO_3$, $MnTiO_3$, $CoTiO_3$, $FeTiO_3$, $NiTiO_3$, $YTiO_3$, $BiFeO_3$, and $AB_2O_4$ type —$CoFe_2O_4$, $NiFe_2O_4$, $MnFe_2O_4$, $NiCo_2O_4$) using the disclosed gel-rod method.

By the disclosed method, many binary metal oxide ceramics could be synthesized at low temperatures (less than 180° C.) with most forming nanomaterials. For example, $BaTiO_3$ (BT) or $Ba_xSr_{1-x}TiO_3$ (BST) could be synthesized upon heating the precursor solution at 45° C. for six hours, or at room temperature for two weeks, and as-synthesized products can self-collect to form solid gel rods, which are well separated from the liquid phase and are completely formed by highly crystalline BT/BST nanoparticles. The method provides almost 100% yield of nanomaterial products that can be easily collected and purified. Zero loss of raw materials can also be confirmed by the NMR results, which show that there are only the starting solvent and organic by-product residues in the liquid solution after the reaction. Furthermore, a series of new multi-metal oxide ceramic nanomaterials have been synthesized based on the present gel-rod method with distinguished properties. For instance, $Ba_{1-1.12}Mn_xTi_{8-x}O_{16}$ nanomaterial possess room temperature ferroelectric properties, low temperature ferromagnetic property and giant dielectric constant up to $10^5$. Compared to traditional solid-state calcination method, the present method has the advantages that, more diverse complex metal oxides with controllable substitution/doping and stoichiometric ratios can be obtained. The sizes of nanomaterials are uniform and tunable in a large size range (15-100 nm). In one embodiment, the nanomaterials have a size between 15 nm and 50 nm. In other embodiments, the nanomaterials vary in size from 1×1×1 nm to 500×500×500 nm with typical sizes being 5×20×20 nm or 10×100×20 nm. For making multi-metal oxide ceramics, the gel rod method followed by low temperature sintering was required. As-synthesized nanomaterials could not only be mechanical pressed for forming polycrystalline tablets or bulks, but also be dissolve into diverse carrier solvents to prepare printable ink for making related embedded devices.

Exemplary Gel-Rod Method for Forming a Multi-Metal Complexes

Figure 1B:
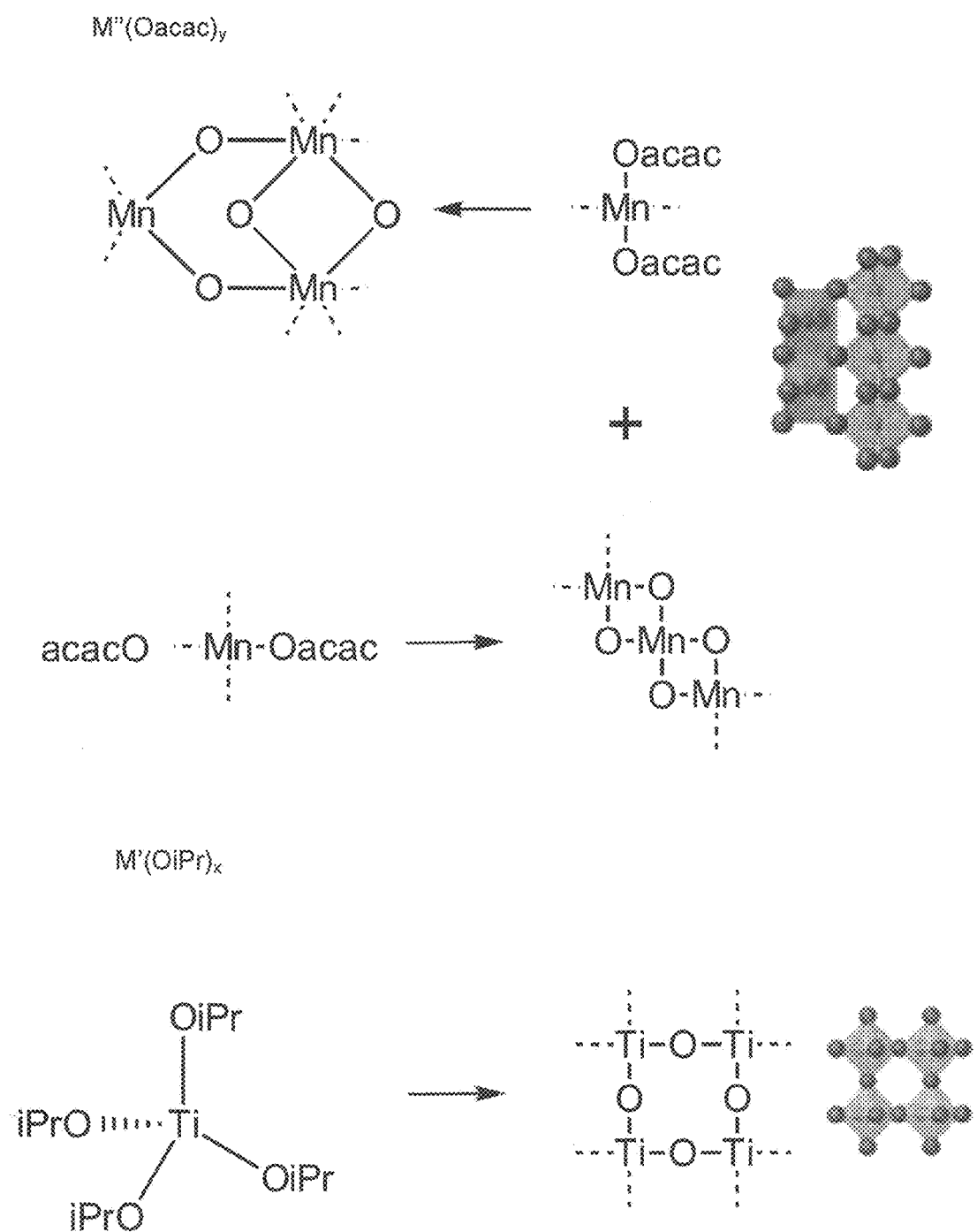
FIG. 1B schematically illustrates control of final nanomaterial structure by selection of metal organic salt composition.

The metals are prepared as a metal alkoxide salt or as a metal 1,3-diketone salt. For example, metal isopropoxide or metal acetylacetonate which have good solubility in solvents such as methanol, ethanol, isopropanol, acetone, could be used. The metal alkoxide salt or as a metal 1,3-diketone salt are mixed together in an anhydrous solvent to form a clear solution under stirring. The final nanomaterial structures are controlled through selection of reacted metal organic salts. For example, metal isopropoxides tend to crosslinking one oxygen atom forming corner-shared oxygen octahedral. Metal acetylacetonates tend to crosslink by sharing two oxygen atoms forming an edge-shared oxygen octahedral. Metal acetylacetones may be selected when intending to form an edge shared oxygen octahedral framework, such as a hollandite structure. Isopropoxides may be selected when intending to form corner-shared oxygen octahedral frameworks, such as a perovskite structure. See FIG. 1B. The solvent is anhydrous solvent to prevent the premature hydrolysis of an intermediate that is formed. Exemplary anhydrous solvents include anhydrous ethanol, anhydrous methanol and anhydrous isopropanol. Anhydrous solvents are generally at least 99% pure. Anhydrous solvents are substantially devoid of water such that the intermediate may be formed before its subsequent hydrolysis, thereby promoting gel formation.

Once the clear solution is formed, a predetermined percentage of water is added. The nature of water used, and the water's predetermined quantity, distinguishes the procedure from a variety of sol-gel or solution processing techniques, and is advantageously to the reaction pathway. The water that is used is deionized water, and should have a conductivity of less than 0.10 µS/cm [or $0.10 \times 10^{-6}$ S/cm)], which corresponds to a resistivity of greater than $10 \times 10^6$ ohms-cm (10 MΩ-cm). The water should also be purged of (i) carbonate or bicarbonate ions (e.g. $CO_3^{2-}$ or $HCO_3^-$) or dissolved carbon dioxide ($CO_2$), and purged of dissolved oxygen (e.g. $O_{2(aq)}$). The specially treated water in predetermined quantity permits controlled hydrolysis of the intermediate, which in turn, controls the size of the resulting multi-metal oxide ceramic nanomaterials. Purity and composition is also influenced by the controlled hydrolysis of the intermediate. Further stirring forms stable precursor solution. The stable precursor solution is left undisturbed until the stable precursor solution turns viscous. Thereafter, the stable precursor solution is heated for a predetermined period of time to promote gel-rod formation. For binary metal oxide ceramics, completely crystalline products could be attained at temperatures lower than 180° C. For multi-metal oxide ceramics, the gel-rod formation followed by low temperature sintering were used for converting an amorphous phase into a crystalline phase.

The significant contributions of the disclosed method include (1) an environmentally friendly solvothermal process that can be applied to synthesize a variety of complex metal oxides, and (2) the discovery of a new class of multi-metal oxides that exhibit extraordinary properties. The successful performance of the method demonstrates that low energy consumption (lower temperature and shorter synthesis time, such as 45° C. and 6 hours) can be used for synthesizing highly crystalline and highly pure BST or doped nanomaterials with minimum waste. Since no catalyst or mineralizing agent are used for the reaction, the multi-metal oxide ceramic nanomaterials can self-collect to provide a solid gel-rod which is well separated from the liquid phase and is completely made of highly crystalline nanoparticles. The synthesis process provides almost 100% yield of nanomaterial products that can be easily collected and purified.

Many unique properties, such as multiferroic property, are provided by the multi-metal oxide ceramic nanomaterials because the substitution/doping to the oxide structure are flexible and could be precisely controlled. For example, the $Ba_xMn_{tx}Ti_{8-tx}O_y$ material system, which exhibits both ferroelectric and ferromagnetic properties, can be used as a semiconductor for making filed effect transistor and optical devices.

In one embodiment, a $Ba_xMn_{tx}Ti_{8-tx}O_y$ system is provided. Structural characterizations show the $Ba_xMn_{tx}Ti_{8-tx}O_y$ system is tetragonal phase at room temperature and belongs to Hollandite family, which are very similar to crystal structure of $Ba_{1.12}Ti_8O_{16}$, where $Mn^{4+}$ ions can substitute $Ti^{4+}$ ions at any ratio.

Property characterization for the $Ba_xMn_{tx}Ti_{8-tx}O_y$ system shows the $BaMn_3Ti_4O_{15}$ exhibits a variety of attractive properties such as giant dielectric constant (up to $10^5$), room ferroelectric property and low temperature ferromagnetic property. Since the substitution/doping of the system is flexible and controllable using the present method, distinguished properties such as multiferroics are promising among some Ba—Mn—Ti—O system or other multi-metal oxide ceramics. For the application of printing, the best dielectric properties (high dielectric constant and low loss) can be achieved from the dropcast composite film of $BaMn_3Ti_4O_{16}$ nanomaterials and PVDF-HFP which, to date, produces the best dielectric properties compared to reported similar 0-3 type composite films.

Figure 2A:
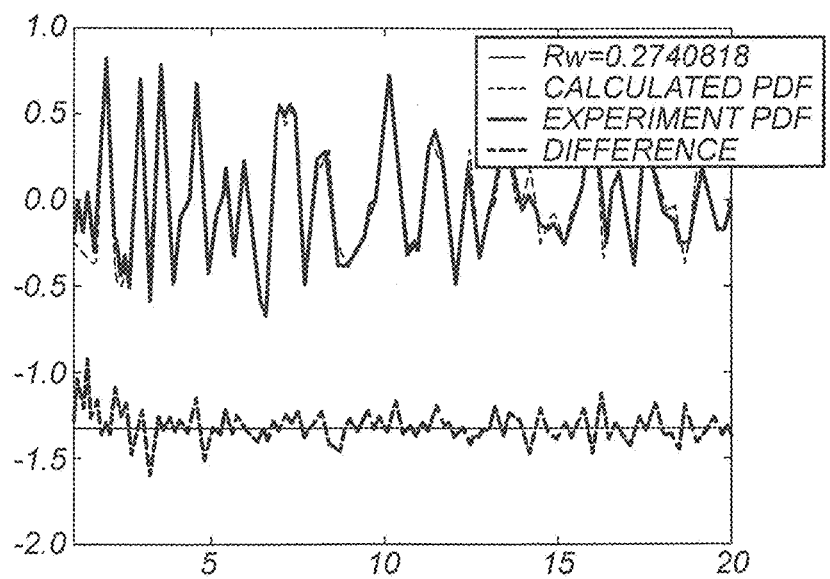
FIG. 2A and FIG. 2B show synchrotron XRD and PDF refinement patterns of crystalline $BaMn_3Ti_4O_{14.5}$ and the crystal structure, spin and charge ordering model of crystalline $BaMn_3Ti_4O_{14.5}$, respectively.
Figure 2B:
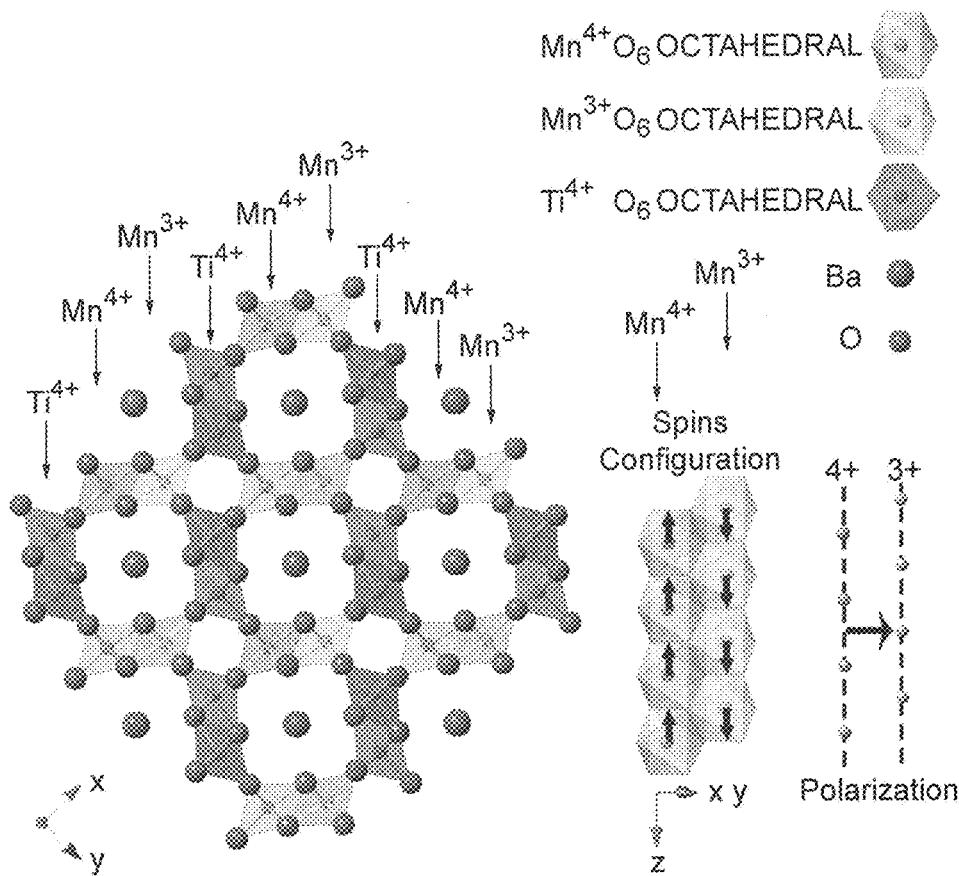

Using the gel-collection method, and reactants in molar composition 1:3:4, a complex oxide based on Ba/Mn/Ti was prepared. A single phase product, a new compound, was readily isolated and identified. The crystallites were studied extensively by synchrotron X-ray diffraction high resolution transmission electron microscopy (FIG. 2A). In FIG. 2A, line 200 is calculated PDF, line 202 is experimental PDF and line 204 is the difference. In summary, a new compound that comprises both Ti and Mn ions was prepared, with the specific formula $BaMn_3Ti_4O_{14.25}$. The structure belongs to the Hollandite supergroup, $A^{II}[M^{IV}, M^{III}]O_{16}$. The combined presence of Mn and Ti cations allows the material to present a variety of unique physical properties as a consequence of electrical polarization, magnetic polarization, and the interaction between the two. FIG. 2B depicts the crystal structure, spin and charge ordering model of $BaMn_3Ti_4O_{14.25}$.

Figure 2C:
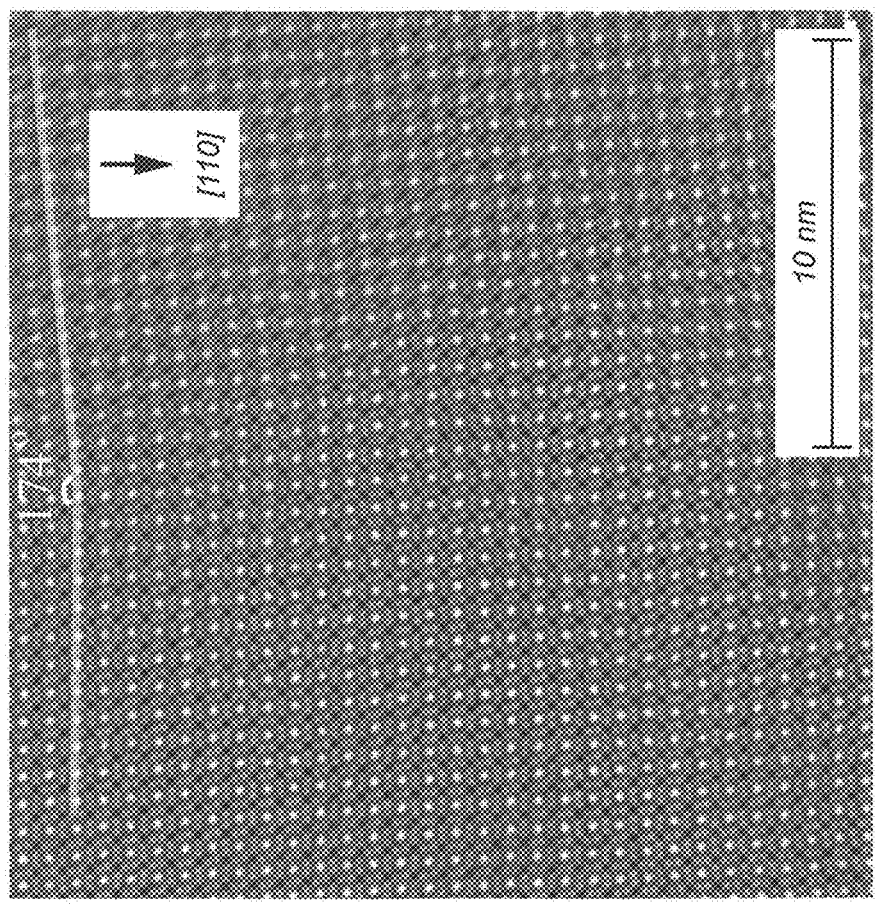
FIG. 2C shows a lattice image by double-aberration HRTEM of $BaMn_3Ti_4O_{14.5}$.

Synchrotron X-ray powder data was collected for Pairwise Distribution Function analysis, PDF. The refinement results show that the compounds closely resemble the redledgeite structure (space group 79, I4). The Ba atoms have local distortions along the z-axis, since a fraction of the Ba atoms are sitting off their equilibrium sites, which is only obvious at low-r range (<20 Å). The Mn and Ti cations are located inside corner and edge-shared oxygen octahedra. Double aberration corrected HRTEM clearly shows the hollandiate type lattice, looking down the channels. There is a small (~6°) lattice rotation (FIG. 2C), attributed to local disorder. XPS analysis confirms the presence of stable $Ti^{4+}$ and mixed $Mn^{3+}$ and $Mn^{4+}$ cations. No $Ti^{4+}$ or $Mn^{2+}$ is detected. In combination with the PDF refinement, the EDX, EELS and XPS analysis, all corroborate the metal cation Ba:Mn:Ti stoichiometric ratio to be 1:3:4, identical to the initial reactant concentration.

Figure 3A:
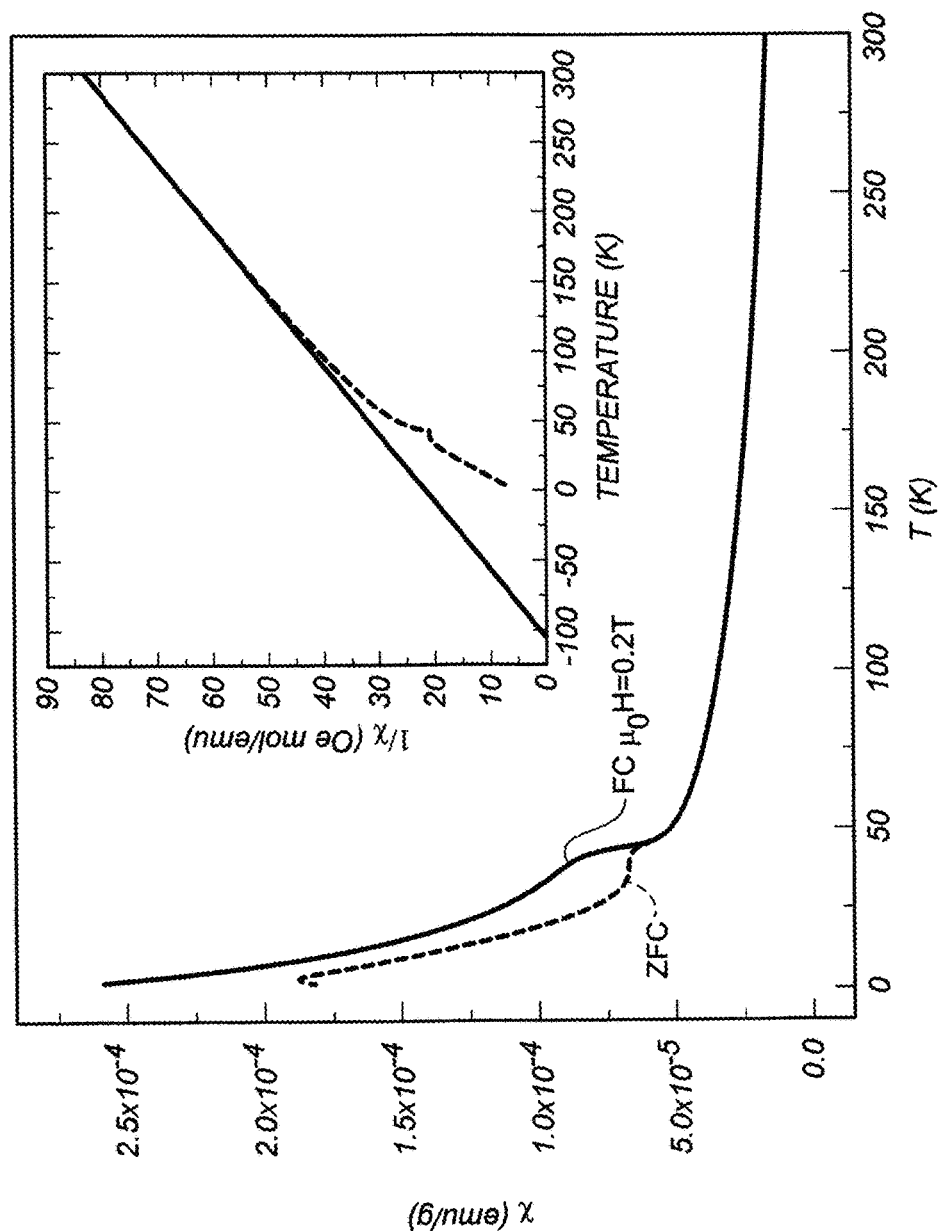
FIG. 3A is a temperature dependent susceptibility plot of $BaMn_3Ti_4O_{14.25}$ measured at 2 kOe under FC and ZFC conditions; the inset shows inverse CFC susceptibility with a Curie-Weiss fit.
Figure 3B:
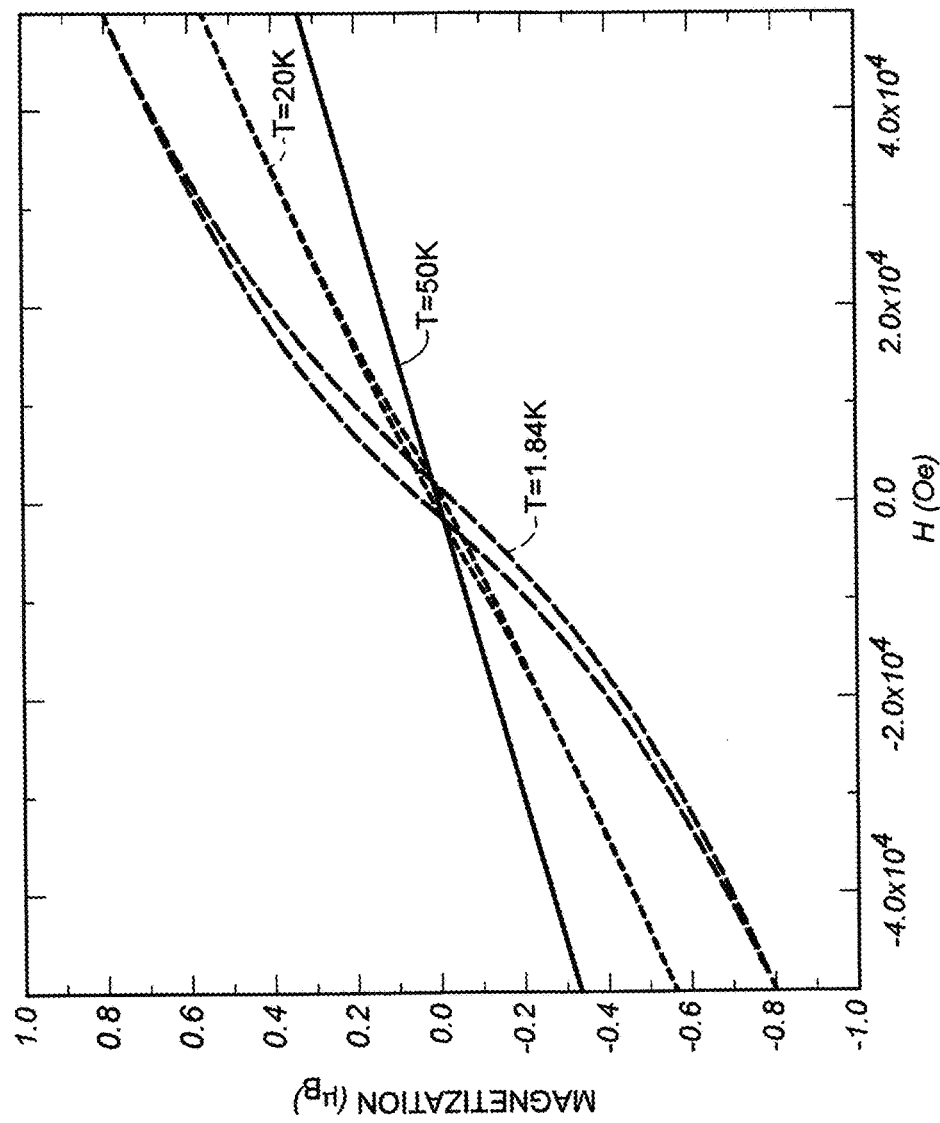
FIG. 3B is a magnetic hysteresis loops of $BaMn_3Ti_4O_{14.25}$ at different temperatures.
Figure 3C:
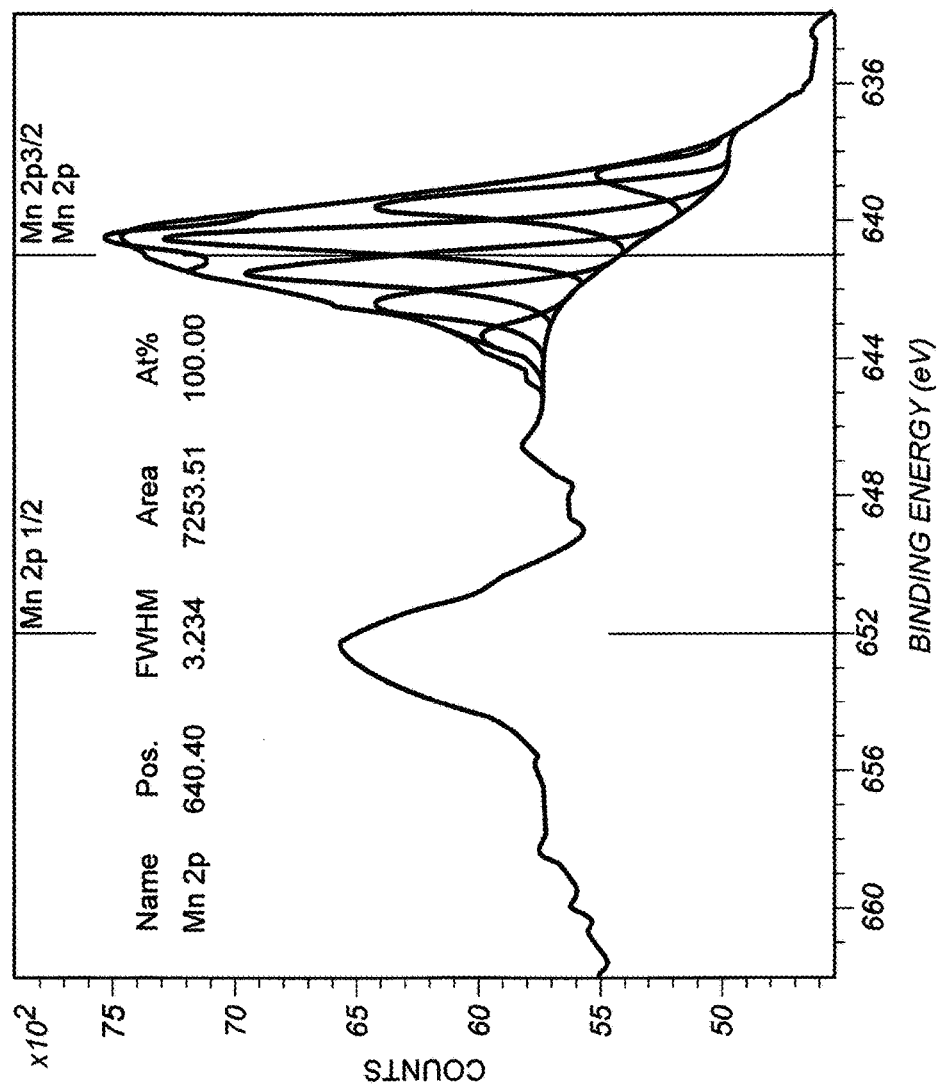
FIG. 3C is an x-ray photoelectron spectroscopy (XPS) analysis of $BaMn_3Ti_4O_{14.25}$.
Figure 3D:
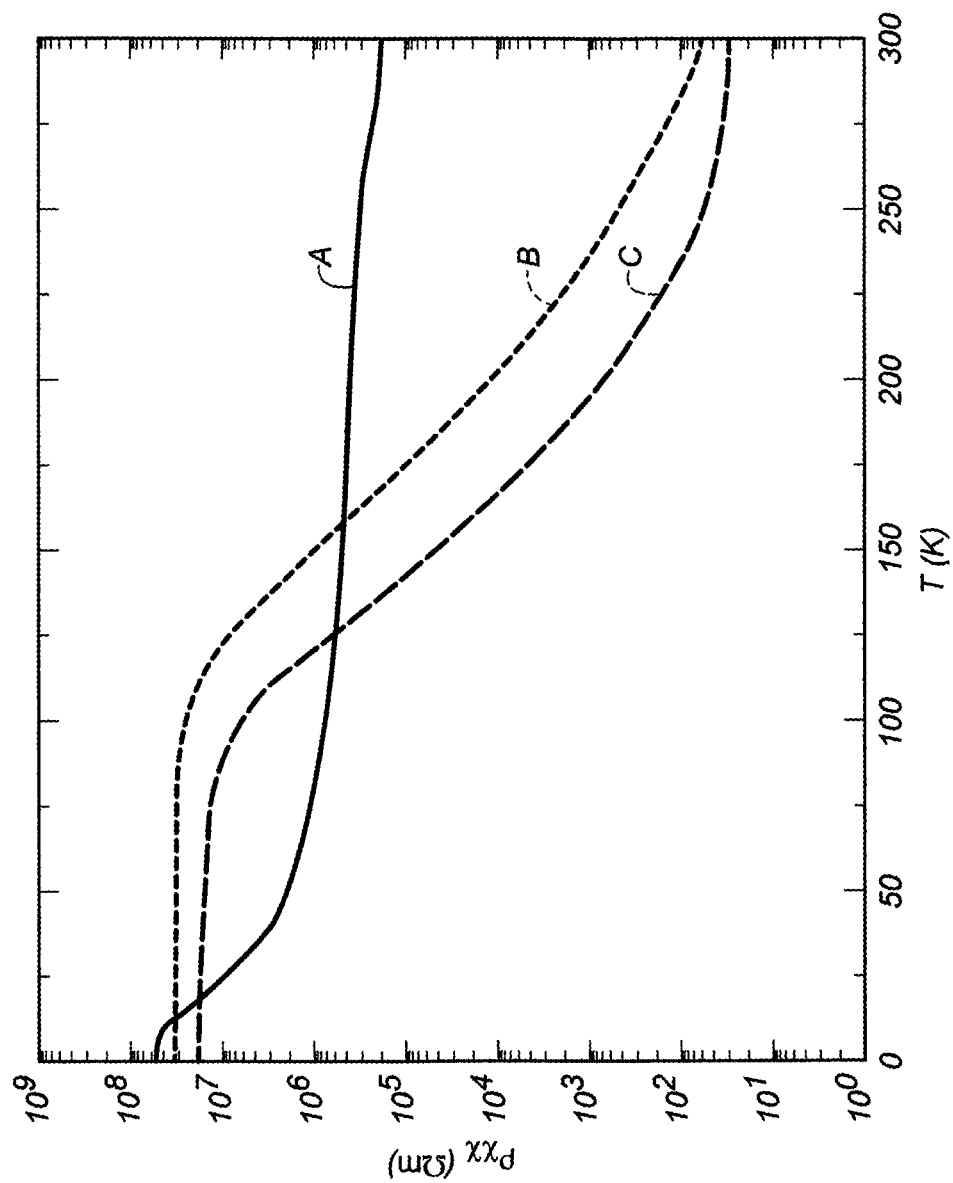
FIG. 3D plots resistivity as a function of temperature with different Ba:Mn:Ti ratios.

Temperature dependent DC magnetic susceptibility (FIG. 3A) shows paramagnetic behavior from 120-300 K, and antiferromagnetic ordering around 42 K ($T_N$). The paramagnetic behavior fits classical Curie-Weiss law behavior (inset of FIG. 3A), $\chi(T)=C/(T-\theta)$, with $C=2.44$ and $\theta=-107$. The estimated effective moment per Mn cations, $4.4\mu_B$, further confirms the presence of $Mn^{3+}$ and $Mn^{4+}$ cations with a ratio of 1:1. Hence, the stoichiometry of the oxide is confirmed as $BaMn_3Ti_4O_{14.25}$, consistent with structure refinement, valence and magnetic analysis. The oxide presents ferrimagnetic behavior below $T_N$ (FIG. 3B), ascribed to the effective moments of $Mn^{3+}$ and $Mn^{4+}$ ordering antiferromagnetically, resulting in a net moment. The saturation magnetization at 1.84K is $\sim 1\mu_B$, equal to difference between $Mn^{3+}$ and $Mn^{4+}$ moments and implies a pair distribution within the lattice. In terms of super-exchange of $Mn^{4+}$—$Mn^{4+}$ and $Mn^{3+}$—$Mn^{3+}$, the stable spin configuration of $Mn^{4+}$ and $Mn^{3+}$ is depicted in FIG. 2B, consistent with previously reported Hartree-Fock calculations. FIG. 3C is an x-ray photoelectron spectroscopy (XPS) analysis indicating evidence of $Mn^{3+}$ and $Mn^{4+}$ and no evidence of $Mn^{2+}$. FIG. 3D is a plot of resistivity as a function of temperature $\rho(T)$ in samples of (Ba—Ti—Mn—O) with differing Ba:Mn:Ti ratios: line A: 1:2:5 ($BaMn_2Ti_5O_{14.5}$), line B: 1:3:4 (BMT-134), and line C: 1:4:3 ($BaMn_4Ti_3O_{14}$). The dramatic change in character of $\rho(T)$ in the case of BMT-134 provides additional evidence of the potential onset of a charge-ordering transition near 120K.

Figure 4A:
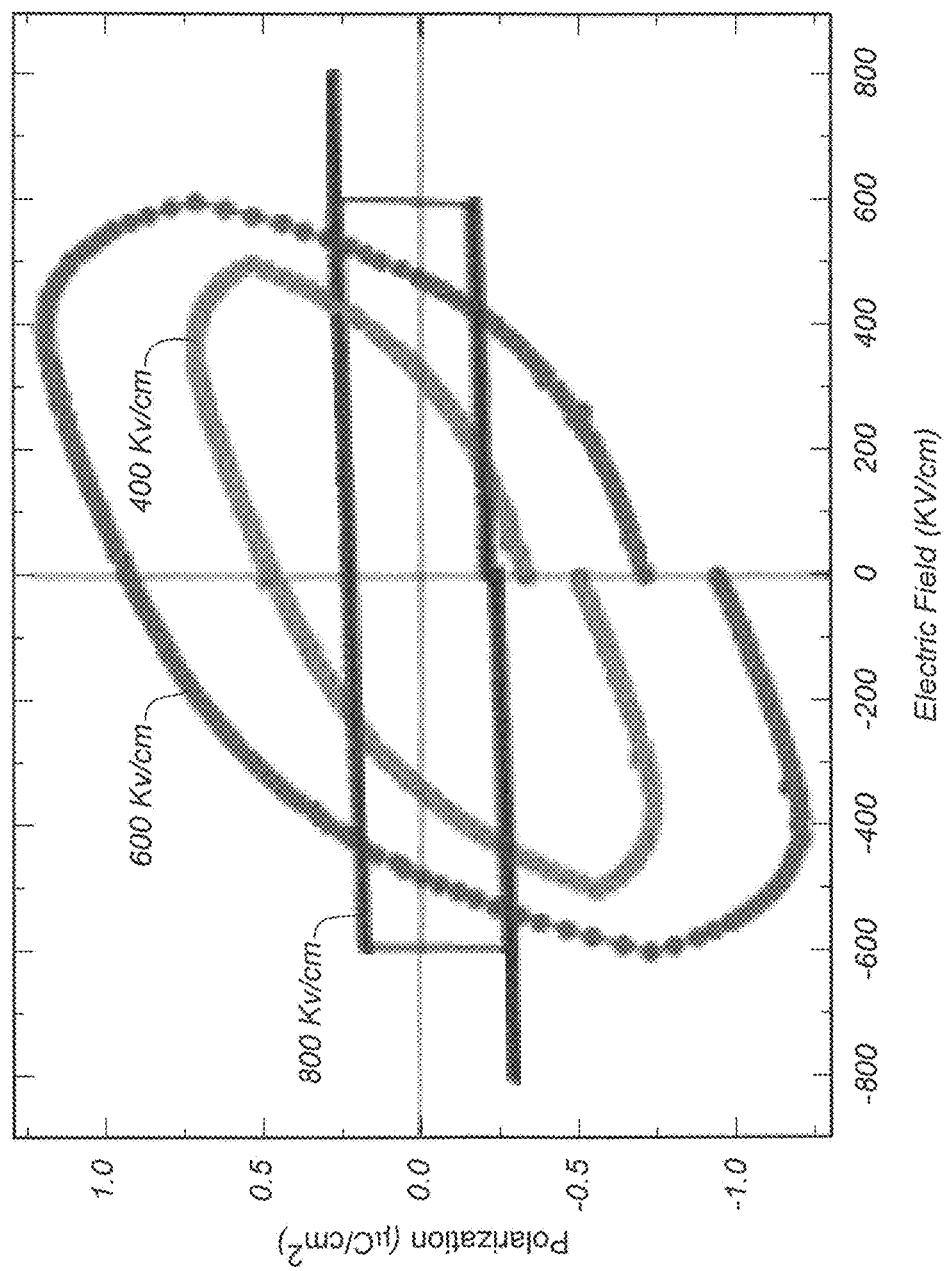
FIG. 4A depicts P-E hysteresis loops of $BaMn_3Ti_4O_{14.25}$ with different maximum applied electric fields.
Figure 4B:
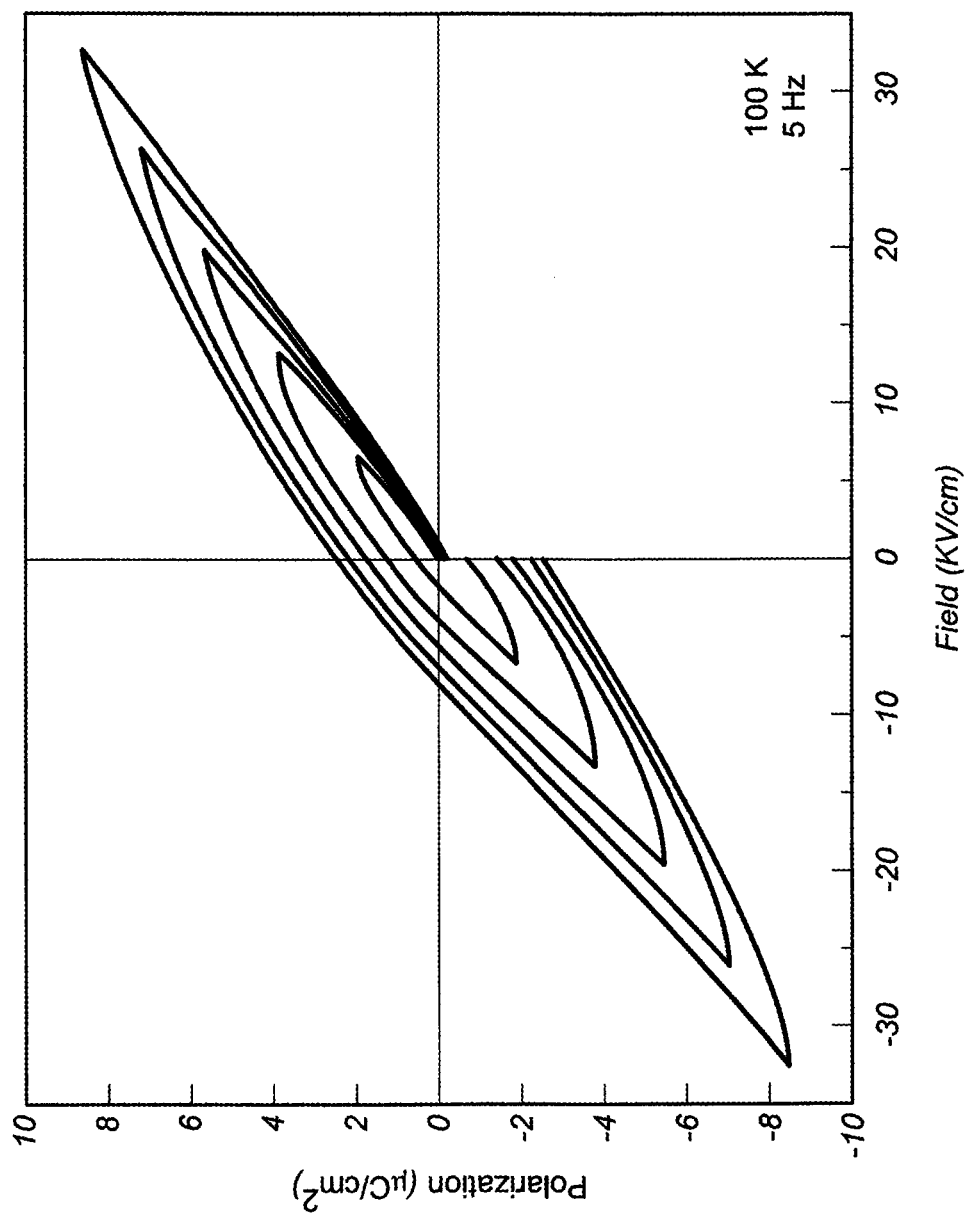
FIG. 4B and FIG. 4C show ferroelectric hysteresis measured in BMT-134 at 100K (FIG. 4B); 120 K (FIG. 4C)
Figure 4C:
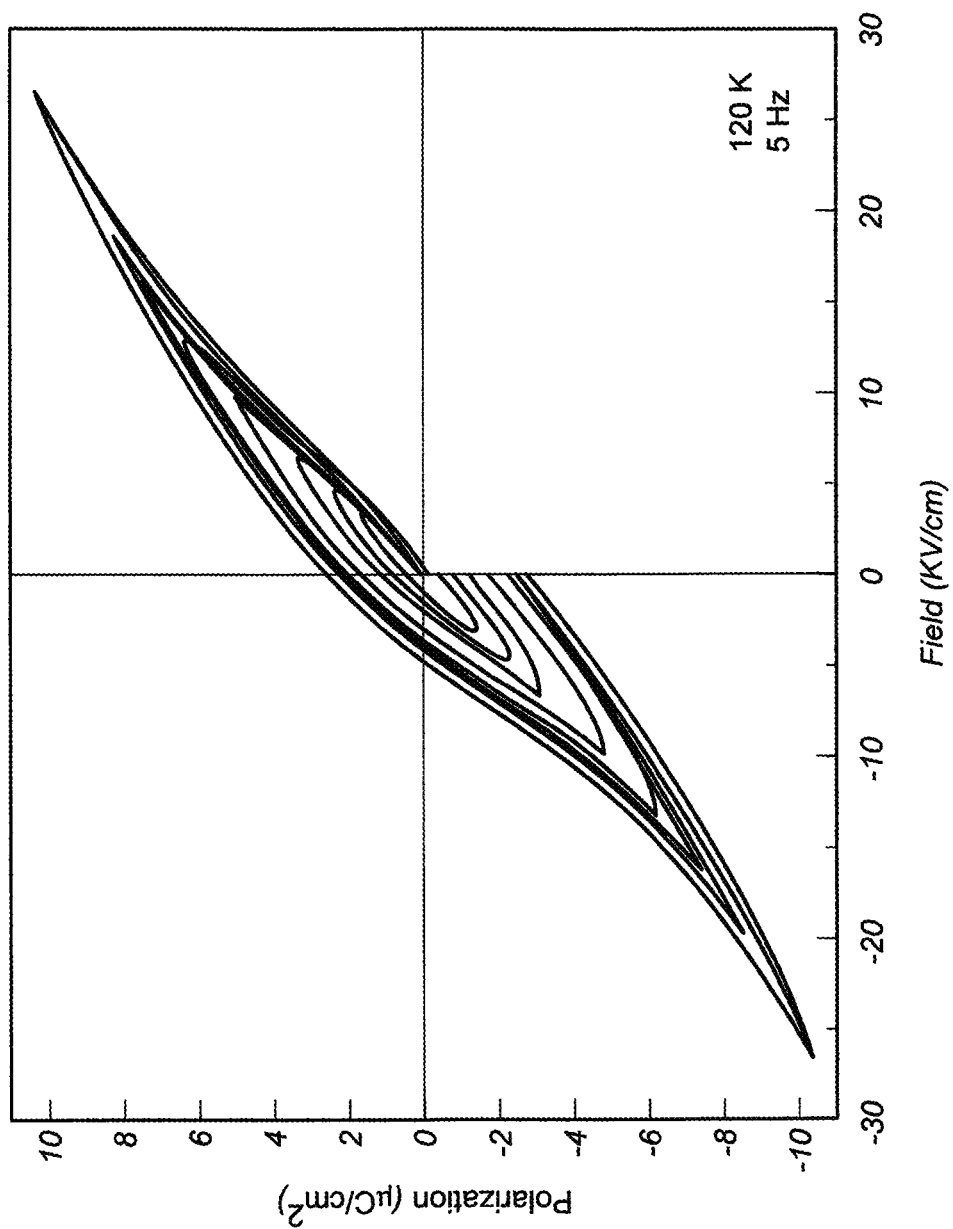
Figure 4D:
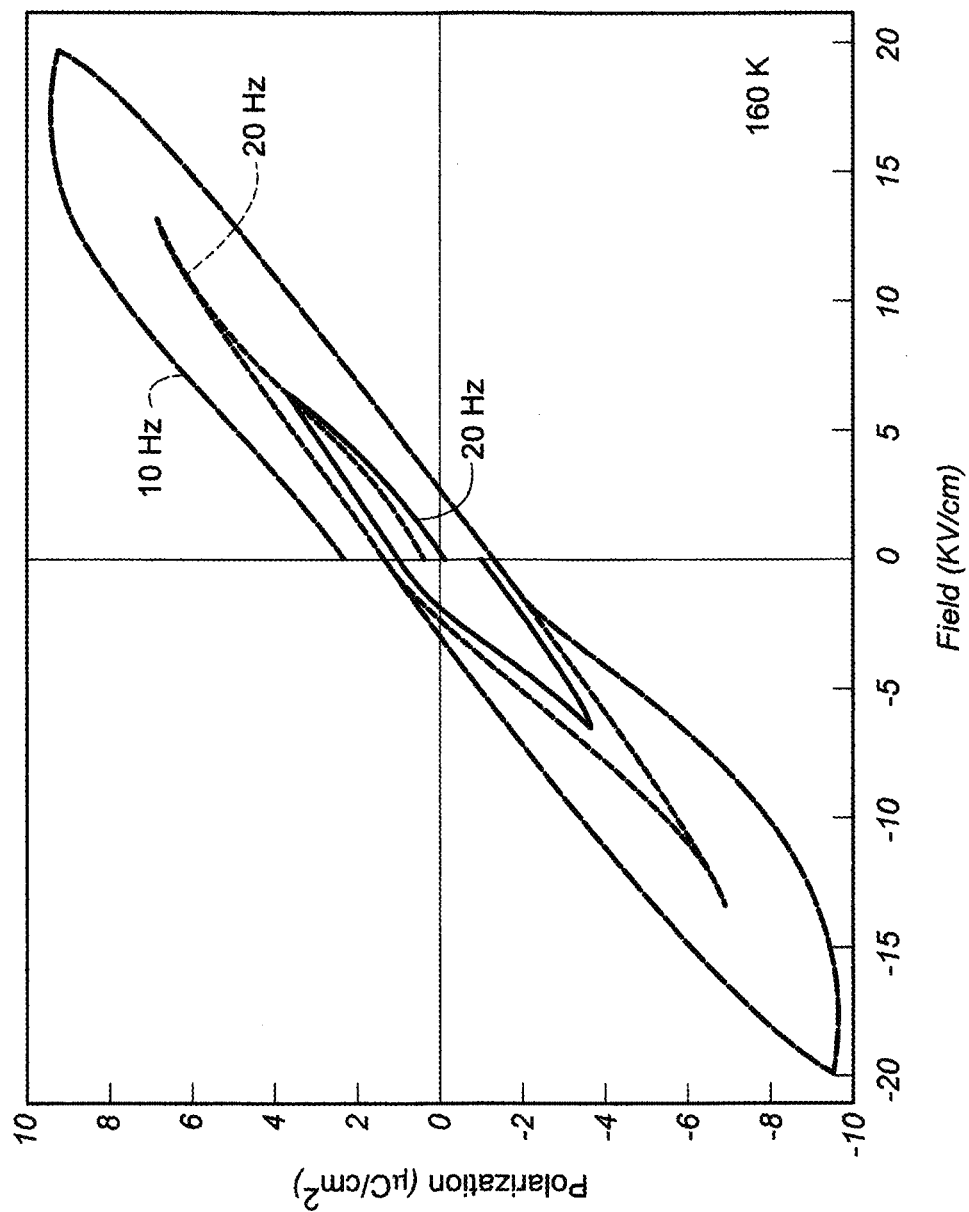
FIG. 4D was measured at 160 K showing unambiguous switching and saturation only at a higher poling rate.

The $BaMn_3Ti_4O_{14.25}$ composition is a multiferroic. One exciting discovery of $BaMn_3Ti_4O_{14.25}$ is that of room temperature ferroelectricity. Generally, $Mn^{3+}$—$Mn^{4+}$ mixed valence oxides exhibit a large electrical conductivity, and would inhibit generation of localized polarization or mask any evidence of ferroelectric hysteresis. Using a Sawyer-Tower/parallel-plate device configuration, ferroelectric hysteresis loops are observed (FIG. 4A). Typical leakage loops are observed for an applied electric field <600 kv/cm. Above this critical value, a transition to a crisp ferroelectric loop with remnant polarization is observed. The leakage type loop for <600 kv/cm is interpreted as due to the presence of mixed valence $Mn^{3+}$—$Mn^{4+}$. The possibility of ferroelectricity due to Schottky contacts and or space charge was unequivocally excluded through C—V analysis. Ferroelectricity in $BaMn_3Ti_4O_{14.25}$ can be ascribed to a field induced phase change by electron correlation of charge ordering. Based on the refined average structure of $BaMn_3Ti_4O_{14.25}$, covalent Ti—O bonds (Ti—O distance in range of 1.9-2 Å) could distort to form dipoles. This would create an alternating chain of anti-parallel dipoles from the to Ti cation neighboring edge-shared oxygen octahedron, which would result in net polarization of zero. Combined with the observation that this field-induced behavior occurs >600 kV/cm, we conclude that the origin of remnant polarization as being due to a displacive transition is unlikely. FIG. 4B, FIG. 4C and FIG. 4D show ferroelectric hysteresis measured in BMT-134 at 100K (FIG. 4B); 120 K (FIG. 4C), each at a 5

Figure 4E:
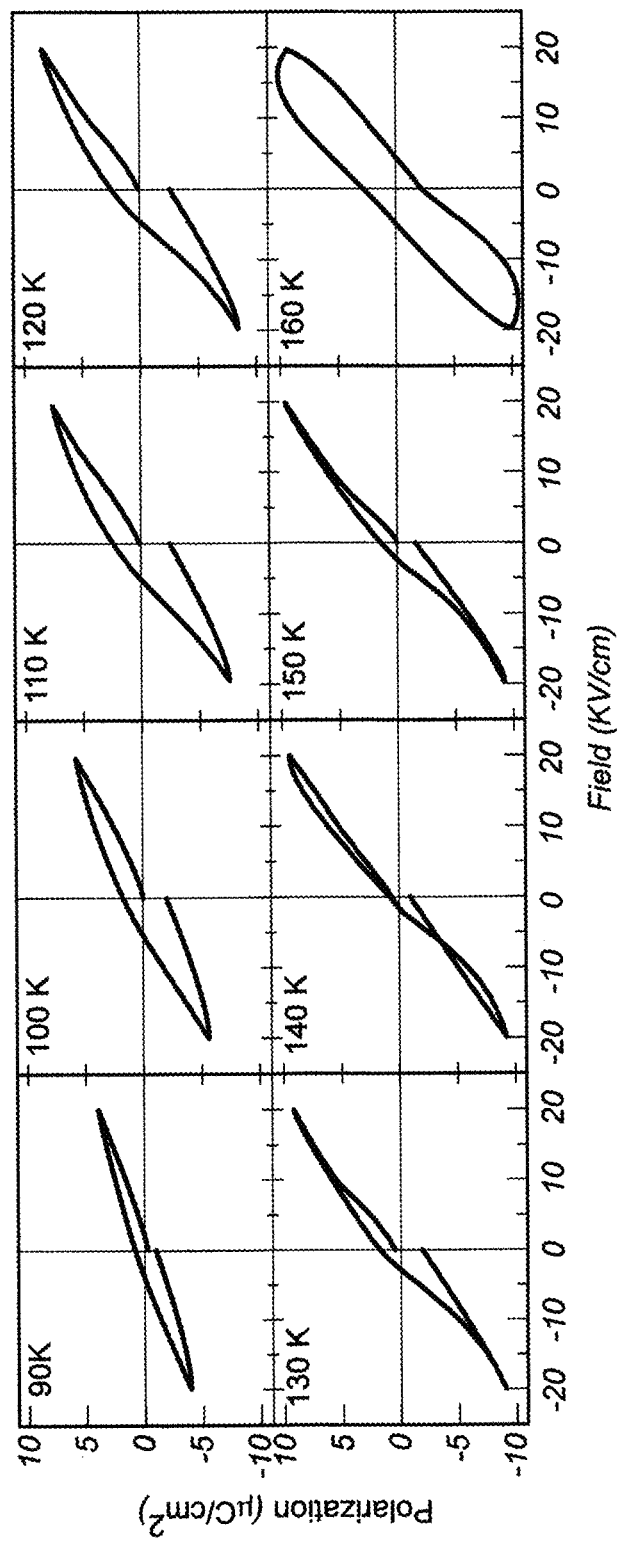
FIG. 4E shows variation in P(E) loops in the same sample using identical voltage sweep rate of 5 Hz.

Hz poling rate, exhibiting ferroelectric switching and saturation at 120 K. FIG. 4D was measured at 160 K showing unambiguous switching and saturation only at a higher poling rate due to stronger charge leakage. FIG. 4E shows variation in P(E) loops in the same sample using identical voltage sweep rate of 5 Hz, indicating an onset of leakage at this poling rate with temperature above about 150 K, below which ferroelectric switching and polarization saturation is observed. At 100 K and below, the value of saturation polarization for a given applied field is seen to decrease for decreasing T, presumably due to application of an insufficiently large field and incomplete poling, consistent with Landau theory for a displacive transition.

Figure 4F:
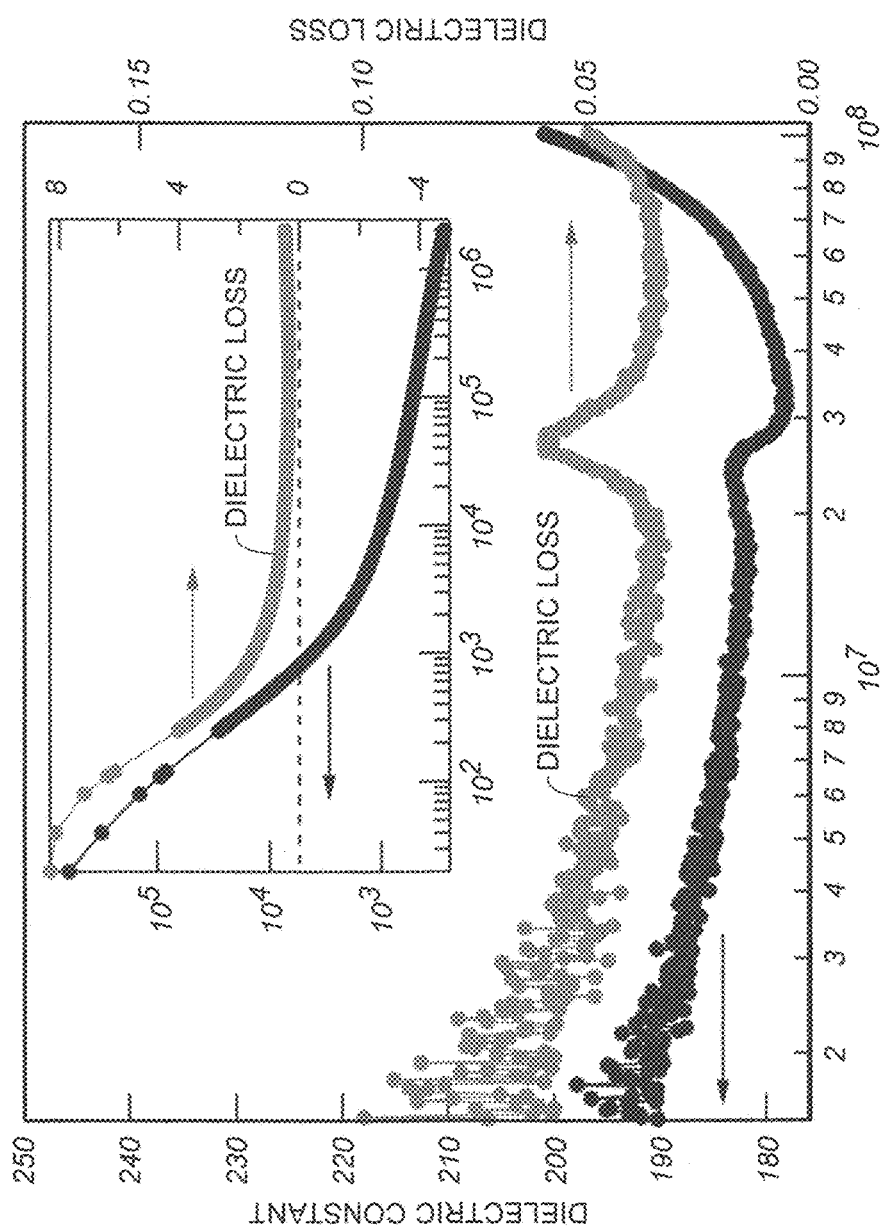
FIG. 4F depicts frequency dependent dielectric properties of $BaMn_3Ti_4O_{14.25}$ from 1-100 MHz, the inset is from 100 Hz-1 MHz at 300 K together with dielectric loss.

Two key structure factors make the hypothesis of electron correlation ferroelectricity credible: first, the $Mn^{3+}$ and $Mn^{4+}$ do not coincide in the unit cell (they are separated by a chain of edge-shared $TiO_6$ octahedra, see FIG. 2B) such that an asymmetric response to the electric field is expected (generation of electrical polarization originating from the electron density modulation). Second, because the structure possesses an insulating layer of $TiO_6$ octahedra that separates the $Mn^{3+}$ and $Mn^{4+}$ ions—a barrier by which electron transfer is restricted—there would be stabilization of the localized polarization state. Sufficiently high electric DC fields causes the unit cell to extend along the [110] direction due to electron density modulation with a polarization in this direction, and such a modulation would be accompanied by a lattice rotation (FIG. 2B). $BaMn_3Ti_4O_{14.25}$ presents a giant dielectric constant (FIG. 4F): the dielectric constant is $>10^5$ at low frequencies, $>10^4$ up to 1 kHz, $>10^3$ up to 1 MHz, and, perhaps most interestingly, remains high, $>200$ up to 100 MHz and beyond (DF<0.1, FIG. 4B inset). The high permittivity is attributed to electron related polarization in conjunction with electron correlation polarization playing key role in the ferroelectric behavior of $BaMn_3Ti_4O_{14.25}$. A new type charge ordering ferroelectricity by field induce was achieved based on new designed and synthesized $BaMn_3Ti_4O_{14.25}$.

In summary, a new multiferroic complex oxide with the formula $BaMn_3Ti_4O_{14.25}$ was identified. The structure belongs to the hollandite supergroup family. The ability to design and synthesize synthetic minerals with multiferroic properties via a novel chemical method, the gel-collection (gel-rod) method, illustrates the power and control of this precursor based inorganic synthesis technique in the search for new oxides with magnetoelectric properties. $BaMn_3Ti_4O_{14.25}$ demonstrates ferroelectricity that is field induced. The origin of the ferroelectricity is attributed to an electron correlation polarization effect.

Methods

Synthesis of oxide frameworks and related nanomaterials: The complex oxide framework rod/cube can be prepared by the gel-collection method. Metal isopropoxide or acetylacetonate, which can solve into the solvents such as methanol, ethanol, isopropanol, acetone, could be raw materials. In a typical synthesis, for example $BaMn_3Ti_4O_{14}$ oxide framework, barium isopropoxide, manganese acetylacetonate and titanium isopropoxide were mixed together in pure ethanol with atomic ratio 1:3:4; after forming clear and transparent solution with magnetic stirring, transfer the solution to autoclave and heated to 100-200° C. above 24 h. Further sintering the rod/cube around 700° C., pure $BaMn_3Ti_4O_{14}$ nanomaterials were obtained.

Synchrotron radiation XRD and PDF refinement: X-ray powder diffraction experiments were performed at X17A beamline at National Synchrotron Light Source (NSLS) Brookhaven National Laboratory. Date were collected at room temperature with an X-ray energy of 67.557 keV ($\lambda$=0.1839 Å) using Rapid acquisition pair distribution function (RAPDF) technique. The 2D detector was used in data collection with a sample to detector distance of 204.067 mm, which is calibrated using a silicon standard sample. The scattering signal from empty kapton tube was measured and subtracted as a background. 2D diffraction patterns were integrated to 1D diffraction intensity in q-space using homemade SrXplanar program and transformed to PDF using PDFgetX3. Experiment PDF was obtained using a sine Fourier transformation of powder diffraction data according to $$G(r) = \frac{2}{\pi} \int_{Q_{min}}^{\infty} Q[S(Q)-1]\sin Qr dQ, \quad (1)$$

where Q is the magnitude of scattering vector and S(Q) is the total scatting structure function. The PDF can be calculated using, $$G(r) = 4\pi r[\rho(r)-\rho_0], \quad (2)$$

where r is the radial distance, $\rho(r)$ is the atomic pair-density at distance r, $\rho_0$ is average atomic number density. The agreement of experiment PDF and calculated PDF is characterized by residual function, $$R_w = \sqrt{\frac{\sum_{i=1}^{N}[G_{obs}(r_i) - G_{calc}(r_i; \vec{P})]^2}{\sum_{i=1}^{N} G_{obs}^2(r_i)}}, \quad (3)$$

where $G_{obs}$ is the experimental PDF, $G_{calc}$ is the calculated PDF from the model and $\vec{p}$ is the list of refinable parameters in the model.

Atomic-resolution TEM: Samples for STEM and EELS were prepared by depositing dilute nanomaterial in ethanol solutions on ultrathin carbon grids. We used JEOL ARM 200CF equipped with a cold field-emission gun and double-aberration correctors at Brookhaven National Laboratory. All STEM and EELS were performed with 200 kV electrons. The acceptance angles for high-angle annular-dark-field (HAADF) detectors were from 68 to 280 mrad. The energy resolution for EELS was about 0.5 eV with 0.25 eV/ch dispersion.

XPS characterization: XPS analyses were carried out with $ESCA^+$ system using a Al KR source (1386.6 eV). The powder of BaMnTiO were mounted on non-conductive adhesive tape of stainless steel sample holder. The base pressure of the deposition chamber was $1\times10^{-9}$ Torr. The survey spectra in the range of 0-1386.6 eV were recorded in 0.1 eV step for the sample, curve fitting was performed after a Shirley background subtraction by a Lorenzian-Gaussian method.

Electric and magnetic properties measurement: The magnetic properties of nanomaterials were measured by Magnetic Properties Measurement System (MPMS, Quantum Design). The sandwich type devices were made by spin coating $BaMn_3Ti_4O_{14}$ nanomaterials (carrier solvent, ethanol) between electrodes, and ferroelectric properties of them were tested by the Precision Workstation (Radiant Technology). Four-point DC temperature dependent conductivity were measured on $BaMn_3Ti_4O_{14}$ tablets by PPMS. Frequency dependent dielectric properties of $BaMn_3Ti_4O_{14}$ tablets were measured by LCR Meter (Agilent, 4980A) and Impedance Analyzer (Agilent, E4991A).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for producing a metal oxide ceramic nanomaterial, the method comprising steps of:
    mixing a first metal-organic salt comprising a first metal ($M^1$) and a second metal-organic salt comprising a second metal ($M^2$) in an anhydrous solvent to form a first intermediate, wherein $M^1$ is selected from the group consisting of barium, manganese, iron, nickel, copper, bismuth, cobalt, samarium, and praseodymium, and $M^2$ is titanium;
    adding deionized water to the anhydrous solvent to hydrolyze the first intermediate to produce a precursor solution;
    permitting the precursor solution to form a gel wherein, after gel formation, at least 90% of $M^1$ and $M^2$ is integrated into the gel; and
    forming a hollandiate nanomaterial from the gel.

2. The method as recited in claim 1, wherein the anhydrous solvent is selected from the group consisting of anhydrous methanol, anhydrous ethanol and anhydrous isopropanol.

3. The method as recited in claim 1, wherein the first metal-organic salt is a acetylacetonate salt.

4. The method as recited in claim 1, wherein the second metal-organic salt is a isopropoxide salt.

5. The method as recited in claim 1, wherein the nanomaterial is a mixed metal oxide of the perovskite structure type of formula $M^1M^2O_3$, where $M^1$ and $M^2$ are different metals.

6. The method as recited in claim 1, wherein the nanomaterial is a mixed metal oxide of the ferrite structure type of the formula $M^1M^2_2O_4$ where $M^1$ and $M^2$ are different metals.

7. The method as recited in claim 1, wherein the nanomaterial is a mixed metal oxide of the formula $M^1_xM^2_yO_z$ wherein x is about 1 to about 3, y is about 1 to about 5, and z is about 3 to about 16.

8. A method for producing a metal oxide ceramic nanomaterial, the method comprising steps of:
    mixing a first metal-organic salt comprising a first metal ($M^1$) and a second metal-organic salt comprising a second metal ($M^2$) in an anhydrous solvent to form a first intermediate, wherein $M^1$ and $M^2$ are independently selected from the group consisting of barium, manganese, titanium, iron, nickel, copper, bismuth, cobalt, samarium, and praseodymium, wherein $M^1$ and $M^2$ are different;
    adding deionized water to the anhydrous solvent to hydrolyze the first intermediate to produce a precursor solution;
    permitting the precursor solution to form a gel wherein, after gel formation, at least 90% of $M^1$ and $M^2$ is integrated into the gel; and
    forming a nanomaterial from the gel; wherein the first metal-organic salt is a 1,3 dicarbonyl salt.

9. A method for producing a metal oxide ceramic nanomaterial, the method comprising steps of:
    mixing a first metal-organic salt comprising a first metal ($M^1$) and a second metal-organic salt comprising a second metal ($M^2$) in an anhydrous solvent to form a first intermediate, wherein $M^1$ and $M^2$ are independently selected from the group consisting of barium, manganese, titanium, iron, nickel, copper, bismuth, cobalt, samarium, and praseodymium, wherein $M^1$ and $M^2$ are different;
    adding deionized water to the anhydrous solvent to hydrolyze the first intermediate to produce a precursor solution;
    permitting the precursor solution to form a gel wherein, after gel formation, at least 90% of $M^1$ and $M^2$ is integrated into the gel; and
    forming a nanomaterial from the gel; wherein the first metal-organic salt is a 1,3 dicarbonyl salt and the second metal-organic salt is an alkoxide salt.

* * * * *